United States Patent [19]

Wilbur et al.

[11] Patent Number: 4,769,916
[45] Date of Patent: Sep. 13, 1988

[54] DEVICE FOR MEASURING THE PERIPHERY OF AN OBJECT

[75] Inventors: Leonard P. Wilbur, Lancaster; William S. Ambler, Manheim, both of Pa.

[73] Assignee: RCA Licensing Corporation, Princeton, N.J.

[21] Appl. No.: 107,186

[22] Filed: Oct. 13, 1987

[51] Int. Cl.[4] .................................................. G01B 3/10
[52] U.S. Cl. .......................................... 33/176; 33/179; 33/549
[58] Field of Search ............. 33/176, 175, 179, 178 R, 33/178 B, 549, 550, 552, 553, 554

[56] References Cited

U.S. PATENT DOCUMENTS

| | | | |
|---|---|---|---|
| 2,625,818 | 1/1953 | Pederson | 33/176 X |
| 2,801,475 | 8/1957 | Meyer | 33/179 |
| 2,895,226 | 7/1959 | Coy | 33/179 |
| 3,779,085 | 12/1973 | Rice | 33/179 X |

Primary Examiner—William D. Martin, Jr.
Attorney, Agent, or Firm—E. M. Whitacre; D. H. Irlbeck; L. L. Hallacher

[57] ABSTRACT

A device for measuring the periphery of the kinescope panels of various sizes includes an elongated measuring member for each panel size. A gauge is associated with each elongated measuring member and is set to zero to get an optimum peripheral measurement. The elongated measuring member is tensioned about the panel and the gauge reading is the difference between the actual panel periphery and the optimum panel periphery.

10 Claims, 4 Drawing Sheets

DEVICE FOR MEASURING THE PERIPHERY OF AN OBJECT

BACKGROUND

This invention relates generally to measuring devices and particularly to a device for measuring the periphery of an object.

There are many occasions in industry when it is necessary to know the periphery of a square, rectangular or circular object without a need for the knowledge of the dimensions of the sides, or radius, of the object. An example of such a need is the manufacture of kinescopes, for color television receivers. One of the last stages in the manufacture of a kinescope is the application of an implosion protection band. Such bands are used to place a high tension around the faceplate of the kinescopes to apply a predetermined amount of tension to the outside of the tube. Because kinescopes are evacuated, the breaking of a tube is a disaster which causes glass to fly in much the same way as shrapnel flies from an exploding grenade. The presence of the implosion protection band causes the glass fragments to fly inwardly of the cabinet which encloses the tube, and thus helps prevent the glass from injuring any persons in the vicinity of a receiver including the imploding tube.

In order for the implosion protection band to operate effectively, it is necessary that the band apply a predetermined amount of tension to the periphery of the panel of the tube. Accordingly, it is essential that the band be properly applied to the tube. There are many techniques utilized in applying implosion protection bands to kinescopes. However, one of the more recent and accurate methods is the heat shrinking of the band onto the kinescope. In such an application, the implosion protection band is accurately dimensioned in accordance with the periphery of the tube and is formed into a solid band. The solid band is then heated to expand sufficiently to enable the band to be placed around the tube. Upon cooling, the band shrinks and applies the necessary amount of tension to the outside of the panel. This operation is quite successful in applying the needed tension to the tube. However, the faceplate panels are made of glass and thus vary somewhat in their peripheral dimensions. For this reason, prior to applying the implosion protection band to the kinescope it is necessary to accurately know the peripheral dimension of the kinescope to assure that previously made bands have a sufficiently accurate peripheral dimension to apply the needed tension to the kinescope. For these reasons there is a need for a device for accurately measuring the periphery of a substantially rectangular object. The present invention fulfills this need.

SUMMARY

A device for measuring the periphery of substantially rectangular objects includes a base plane, and a first plurality of object support means for receiving an object. The object support means are moveable between an object receiving position and an object locating position spaced a predetermined distance from the base plane. A first elongated measuring member is arranged to encircle an object supported the predetermined distance from the base plane, and has a first and second free end. A plurality of holding means are spaced at intervals about the measuring member for holding the measuring member a selected distance from the base plane. Each of the holding means includes a first slideable member for urging the measuring member against an object to be measured. First and second spread apart support blocks are individually affixed to the first and second free ends, respectively. The support blocks are urged toward one another whereby the elongated measuring member is tensioned about an object to be measured. A first gauge means gives a reading indicative of the periphery of an object being measured in response to the tensioning of the measuring member about the object.

DETAILED DESCRIPTION

Figure 1A:
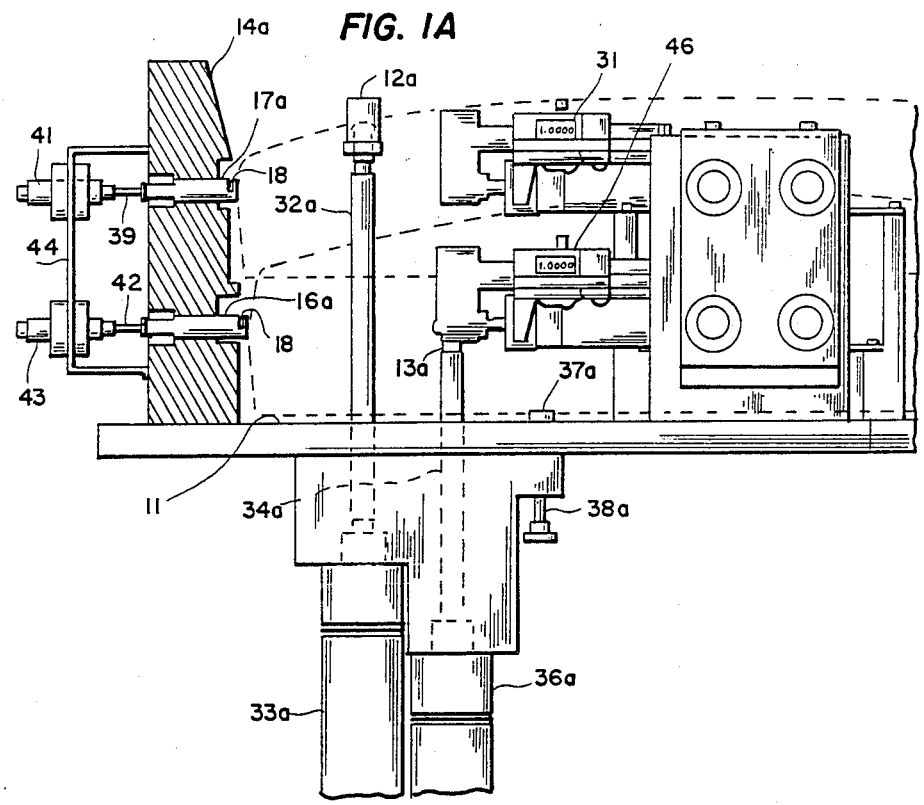
FIGS. 1A and 1B are a front view of a preferred embodiment.

In FIGS. 1A and 1B, and FIGS. 2A and 2B, a device 10 for measuring the periphery of a substantially rectangular shaped object includes a base plane 11. A first plurality of object support members 12a, 12b, 12c and 12d are arranged above the base plane 11. A second plurality of object support members 13a, 13b, 13c and 13d also are arranged above the base plane 11. A plurality of holding members 14a, 14b, 14c, 14d, 14e, 14f and 14g are arranged in a substantially rectangular pattern about the base plane 11, such that four of the holding members are arranged at the corners of the rectangular pattern and three are arranged close to the midpoints of three of the sides of the rectangular pattern. Each of the holding members 14a through 14g includes a first slideable member, such as 16a and 16e shown in FIGS. 1A and 1B respectively. Each of the holding members 14a through 14g also includes a second slideable member, such as 17a and 17e shown in FIGS. 1A and 1B respectively. The slideable members 16a to 16g and 17a to 17g are spaced from the base plane 11 at first and second preselected distances, respectively.

Each of the slideable members 16a through 16g, and 17a through 17g includes a slot 18. The slots 18 within the slideable members 17a through 17g support an elongated measuring member 19 having a first free end 21 and a second free end 22. The elongated measuring member 19 is dimensioned to loosely encircle and object located between the holding members 14a to 14g. A first support block 23 includes an extension 24, to which the free end 21 is permanently affixed. A second support block 26, includes an extension 27 to which the free end 22 is affixed. The support block 26 is affixed to a shaft 28 of a cylinder 29. The support block 23 is slideable on the shaft 28 of the cylinder 29. When the cylinder 29 is actuated the shaft 28 is retracted into the cylinder and the spaced apart blocks 23 and 26 are urged toward one another to tighten the elongated measuring member 19 about the object being measured. A gauge 31 is affixed to the cylinder 29 and measures the motion of the support blocks 23 and 26. As explained hereinafter, this measurement becomes a direct indication of the periphery of the object to be measured.

A similar elongated measuring member, not shown, is supported by the slots 18 within the slideable members 16a through 16g. The spacing between the slideable members 16a to 16g is less than the spacing between the slideable members 17a to 17g. Accordingly, the nominal periphery of the elongated measuring member 19 which is supported by the slideable members 17a to 17g is slightly larger than the periphery of the elongated measuring member held by the slideable members 16a to 16g. For this reason, two different sized objects can be conveniently measured with the device 10.

In FIG. 1A, the object support member 12a is affixed to the shaft 32a of a cylinder 33a. Similarly, the object support member 12d is affixed to the shaft 32d of a cylinder 33d. The object support members 12b and 12c are also affixed to the shafts of cylinders, not shown. The object support member 13a is affixed to the shaft 34a of a cylinder 36a. Similarly, the object support member 13d is affixed to the shaft 34d of a cylinder 36d. The object support members 13b and 13c are similarly affixed to the shafts of cylinders, not shown. A plurality of reference pads 37a through 37d are arranged in the proximity of the object support members 13a through 13d. The reference pad 37a is affixed to a threaded member 38a, which is used to adjust the height of the reference pad 37a above the base plane 11. The reference pads 37b through 37d are similarly affixed to threaded members. Accordingly, when an object of the smaller size is placed upon the object support members 13a to 13d the shafts 34a to 34d are retracted into the cylinders 36a to 36d until the object rests upon the reference pads 37a. The object on the reference pads 37a to 37d is then spaced a predetermined distance from the base plane 11. When an object of the larger size is placed upon the object support members 12a through 12d the shafts 32a to 32d of the cylinders 33a to 33d are retracted into the cylinders until the larger object rests upon the support members 13a to 13d. The shafts 34a to 34d of the cylinders 36a to 36d are fully extended to support the object a second predetermined distance above the base plane 11. The support members 13a to 13d are sufficiently large to support a larger object at the second predetermined distance. Also the support members 13a to 13d, preferaably are adjustably coupled to the shafts 34a to 34d.

Figure 3:
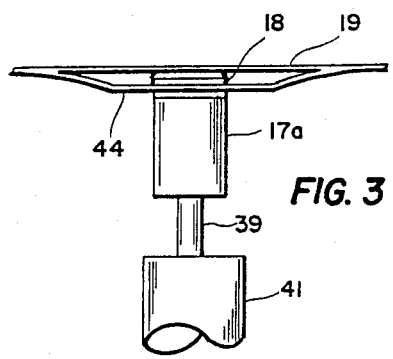
FIG. 3 shows the holding device for the elongated measuring member in more detail.
Figure 1B:
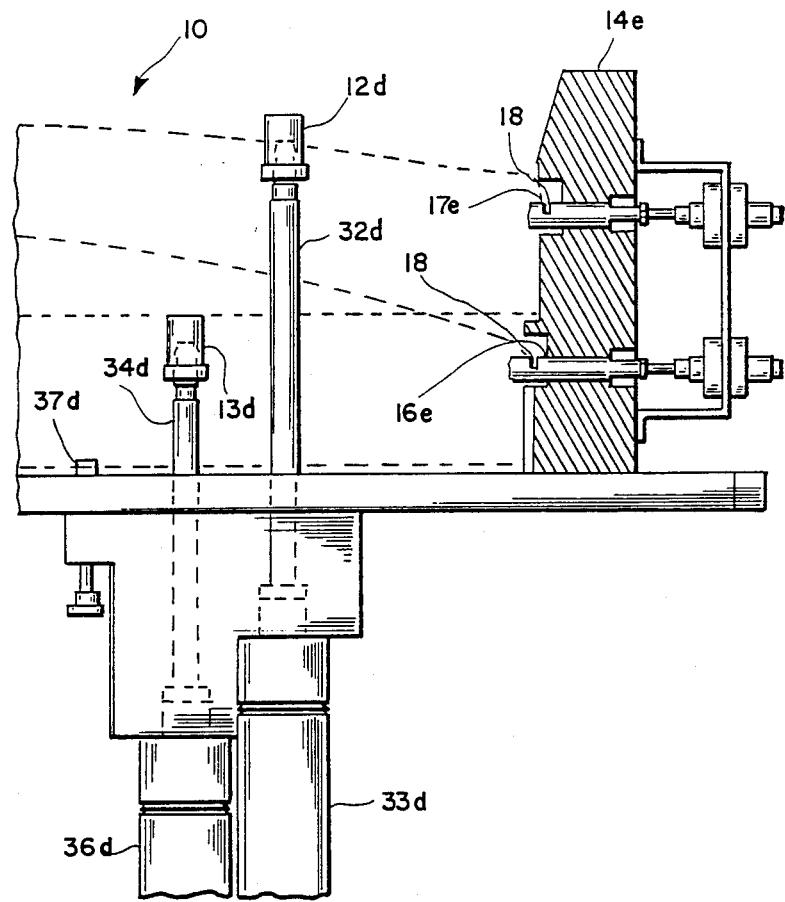
Figure 2A:
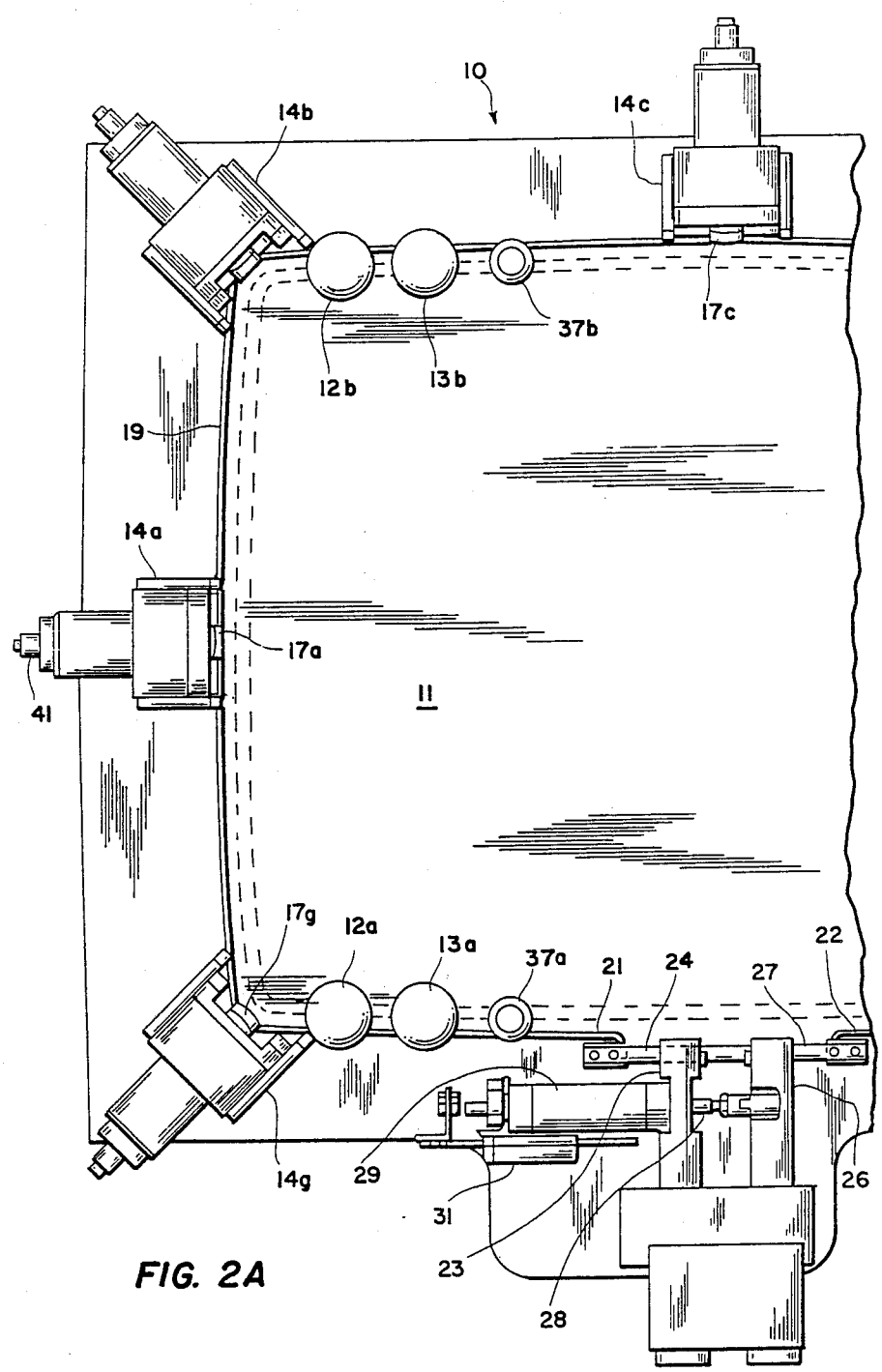
FIGS. 2A and 2B are a top view of the preferred embodiment of FIGS. 1A and 1B.
Figure 2B:
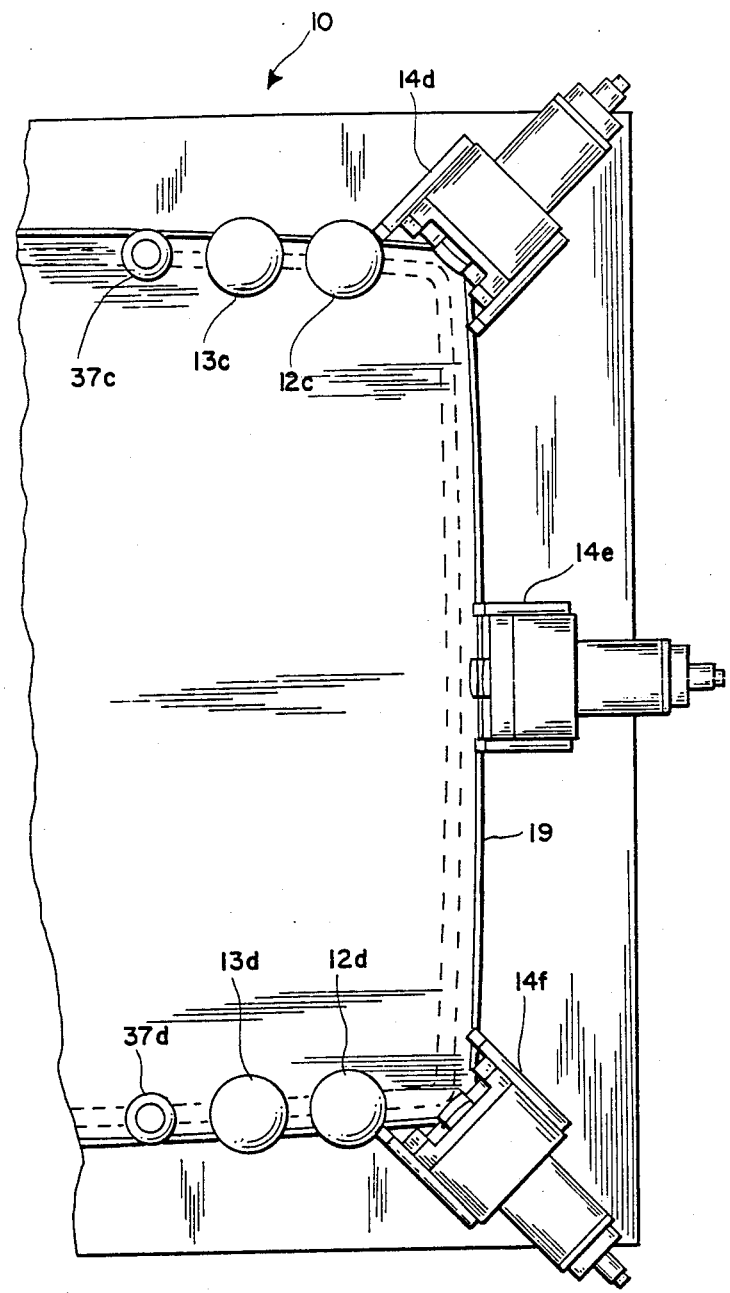

The slideable member 17a is affixed to the shaft 39 of a cylinder 41. Similarly, the slideable member 16a is affixed to the shaft 42 of a cylinder 43. The cylinders 41 and 43 are supported in the holding member 14a by appropriate brackets, such as 44. The other slideable members 17b to 17g and 16b to 16g are similarly supported in the holding members 14b to 14g, respectively. As shown in FIG. 3, the elongated measuring member 19 includes a plurality of holding portions 44 which rest in the slots 18 of the various slideable members 17a to 17g. The number of holding portions 44 is equal to the number of holding numbers 14a to 14g. The elongated measuring member 19, therefore, rests between the ends of the holding members 17a to 17g and the object being measured. After the object is inserted into the device 10 the cylinder 41, and the other cylinders positioned around the device 10, are actuated to urge the elongated measuring member 19 against the sides of the object. The cylinder 29 (FIG. 2A) is actuated to cause the ends 21 and 22 of the elongated measuring member 19 to move toward one another and tension the elongated measuring member 19 about the object being measured. The cylinders, such as 41, thus urge the slideable members 17a to 17g against the object being measured to center the object being measured within the measuring device 10 but with a force which is sufficiently low to permit the elongated measuring member 19 to slide between the end of the slideable members 19 and the object being measured. This substantially decreases the length of the stroke of the cylinder 29, which is requried to produce an accurate measurement of the object being measured.

In operation, the device 10 can be used to measure either one of two sizes of objects. For example, either 26 or 27V faceplates for color kinescopes (66 cm diagonal and 68.6 cm diagonal, respectively). Prior to making any measurements, a reference object having a known, optimum periphery measurement, is placed into the device 10 and rests upon the reference pads 37a to 37b. The elongated measuring member supported by the slideable members 16a to 16g is tensioned about the reference object and the gauge 46 associated with the particular elongated measuring member is set to zero. Immediately after setting the gauge 46 to zero, a reference object having an optimum periphery for the larger objects, such as a 27V panel, is placed upon the object holding members 12a to 12b to ultimately rest upon the support members 13a to 13d at the second preselected distance from the base plane 11. The elongated measuring member 19 is then tensioned by actuation of the cylinder 29 and the gauge 31 set to zero. The reference objects are removed from the device 10, and the device is ready to measure either 26V or 27V kinescope panels. When a 26V panel is being measured, the panel is placed upon the support members 13a to 13b. The shafts 34a to 34d of the various cylinders are retracted into the cylinders 36a and the object rests upon the reference pads 37a to 37d. The cylinder, which tensions the elongated measuring member about the panel being measured, is actuated and the reading on the gauge 46 is an indication of the difference between the periphery of the panel being measured and the reference panel previously used to set the gauge to zero. The reading of the gauge, thus, is a direct indication of the difference of the periphery of the panel being measured from the optimum panel periphery. The indication of a peripheral measurement above, or below, a tolerance allowable for the proper implosion protection of a kinescope, thus, results in either the panel being rejected, or the assembly line being informed that an implosion protection band having a peripheral dimension different from the optimum must be utilized to properly implosion protect the kinescope including that particular panel.

When a 27V panel is to be measured, the panel is placed upon the support members 12a to 12d and the shafts 32a to 33d are retraced into the cylinders 33 whereby the panel rests upon the support members 13a to 13d. The elongated measuring member 19 is tensioned about the panel by actuation of the cylinder 29 and the gauge 31 is read to indicate the difference of the peripheral dimension of the panel being measured from that of the optimum panel. To remove an object which has been measured from the device 10 the cylinders 33 or 36 are actuated to extend the shafts of the cylinders and raise the panel upwardly making the panel convenient for removal from the device, either manually or by automatic means.

What is claimed is:

1. A device for measuring the periphery of substantially rectangular objects comprising:
    a base plane;
    a first plurality of object support means for receiving an object, said first object support means being moveable between an object receiving position and an object locating position spaced a predetermined distance from said base plane;

a first elongated measuring member arranged to encircle an object supported at said locating position, said measuring member having a first and a second free end;

a plurality of holding means spaced at intervals about said measuring member for holding said measuring member at said locating position, each of said holding means including a first slideable member for urging said measuring member against an object to be measured;

first and second spread apart support blocks individually affixed to said first and second free ends, respectively;

means for urging said support blocks toward one another whereby said elongated measuring member is tensioned about an object to be measured; and first gauge means for giving a reading indicative of the periphery of an object being measured in response to the tensioning of said measuring member about said object.

2. The device of claim 1 wherein said gauge is affixed to one of said support blocks and is set to a zero reading when said elongated measuring member is tensioned about a reference object having an optimum periphery, whereby the gauge reading when said elongated measuring member is tensioned about an object being measured is the difference of the periphery of said object being measured from said optimum periphery.

3. The device of claim 2 wherein said holding means are slideable in a direction substantially parallel to said base plane.

4. The device of claim 3 wherein said slideable members each include a slot for supporting said elongated measuring member, and wherein said elongated measuring member includes holding portions arranged in said slots, whereby said elongated measuring member is slideable between said holdimg means and an object being measured when said elongated measuring member is tensioned about said object being measured.

5. The device of claim 4 wherein said means for urging, and said support blocks, are free to float with respect to said device.

6. The device of claim 5 further including a second plurality of object support means;

a second elongated measuring member arranged to encircle an object supported at a second object locating position spaced a second preselected distance from said base plane;

a second plurality of holding means arranged in the proximity of said second elongated measuring member; and a second gauge means, said second support members and said second holding means being arranged to receive an object having a periphery different from the periphery of an object received by said first support means, and said second elongated measuring member having a different optimum periphery from said first elongated measuring member, whereby objects of different optimum peripheries can be measured in said device.

7. The device of claim 6 wherein said first and second pluralities of holding means, and said first and second elongated measuring members are arranged at different distances from said base plane.

8. The device of claim 1 further including a second plurality of object support means;

a second elongated measuring member arranged to encircle an object supported at a second object locating position spaced a preselected distance from said base plane;

a second plurality of holding means arranged in the proximity of said second elongated measuring member; and a second gauge means, said second support members and said second holding means being arranged to receive an object having a periphery different from the periphery of an object received by said first support means, and said second elongated measuring member having a differnt optimum periphery from said first elongated measuring member, whereby objects of different optimum peripheries can be measured in said device.

9. The device of claim 8 wherein said first and second pluralities of holding means, and said first and second elongated measuring members are arranged at different distances from said base plane.

10. The device of claim 9 wherein said gauge is affixed to one of said support blocks and is set to a zero reading when said elongated measuring member is tensioned about a reference object having an optimum periphery, whereby the gauge reading when said elongated measuring member is tensioned about an object being measured is the difference of the periphery of said object being measured from said optimum periphery.

* * * * *